United States Patent [19]

Eckberg

[11] Patent Number: 4,476,166

[45] Date of Patent: Oct. 9, 1984

[54] SILICONE RELEASE COATINGS AND INHIBITORS

[75] Inventor: Richard P. Eckberg, Round Lake, N.Y.

[73] Assignee: General Electric Company, Waterford, N.Y.

[21] Appl. No.: 458,420

[22] Filed: Jan. 17, 1983

[51] Int. Cl.$^3$ .......................... B05D 3/02; C09J 7/02; B32B 9/04; C08G 77/06
[52] U.S. Cl. .................... 427/387; 427/389.7; 427/391; 428/342; 428/352; 428/392; 428/429; 428/438; 428/449; 428/452; 428/457; 525/477; 525/478; 525/479; 528/12; 528/15; 528/26; 528/31; 528/32
[58] Field of Search ...................... 528/12, 15, 26, 31, 528/32; 428/342, 392, 452, 447, 438, 429, 352, 457; 427/389.7, 391, 387; 525/478, 477, 479

[56] References Cited

U.S. PATENT DOCUMENTS

| 4,256,870 | 3/1981 | Eckberg | 528/15 |
| 4,262,107 | 4/1981 | Eckberg | 528/31 |
| 4,340,647 | 7/1982 | Eckberg | 428/429 |
| 4,347,346 | 8/1982 | Eckberg | 428/447 |

Primary Examiner—Herbert J. Lilling
Attorney, Agent, or Firm—Gary L. Loser

[57] ABSTRACT

A solventless release coating composition is provided as well as a method for rendering materials nonadherent to other materials which would normally adhere thereto. The coating composition is a precious metal catalyzed silicone composition comprising a vinyl functional polysiloxane base polymer and a methylhydrogen cross-linking agent. A blend of diallylmaleate and vinyl acetate is added to the composition in order to extend the useful pot-life of the product by inhibiting premature cross-linking.

42 Claims, No Drawings

SILICONE RELEASE COATINGS AND INHIBITORS

BACKGROUND OF THE INVENTION

The present invention relates to silicone release coating compositions and inhibitors therefor. More particularly, the present invention relates to a blend of a dialkyl carboxylic ester having carbon to carbon unsaturation and an olefinic carboxylic acid ester of an aliphatic alcohol as an inhibitor for precious metal catalyzed polysiloxane compositions which are particularly well suited for solventless silicone release coating compositions.

Silicone compositions have long been used for rendering surfaces nonadherent to materials which would normally adhere thereto. For a long time it was necessary that these silicone coatings be applied as a dispersion within a solvent in order to control the viscosity of the coating material so as to be suitable for coating applications. However, although the solvent aids in the application of the coating, it is a highly inefficient process inasmuch as the solvent must thereafter be evaporated. The evaporation of solvents requires large expenditures of energy and, additionally, pollution control requirements mandate that solvent vapors be prevented from escaping into the environment. Thus, removal and recovery of solvents entails considerable expenditures for apparatus and energy.

Consequently, solventless release coating compositions, sometimes referred to as 100% solids release compositions, have been developed. The absence of a solvent in such compositions both lowers the amount of energy required to effect curing and eliminates the need for expensive pollution control equipment. However, a problem associated with such silicone release coatings relating to premature gelation must be overcome. Since a typical composition is made up of a vinyl chain-stopped base polymer, a cross-linking agent and a platinum metal catalyst, premature curing or gelation may occur in a short period of time, thus resulting in a product with an unsatisfactory pot-life. When the composition is ready for use it is desirable that the catalyzed polymer composition have a sufficiently long pot-life to enable the end-user to carry out the coating application. Accordingly, the coating composition is provided with an inhibitor which effectively retards the hydrosilation addition cure reaction of the composition at ambient temperature, but does not retard the cure at elevated temperatures. Examples of inhibitors which have been utilized in prior art solventless release compositions include vinyl acetate, diallylmaleate and triallylisocyanurate (TAIC).

Eckberg in U.S. Pat. No. 4,256,870 discloses a silicone composition comprising a base polymer such as a vinyl chain-stopped polydialkyl-alkylvinyl polysiloxane base copolymer and a methylhydrogen cross-linking fluid. This composition is catalyzed by platinum or a platinum metal complex which will initiate an addition cure reaction. An inhibitor selected from organic esters of maleic acid is added to the composition in order to selectively retard the cure reaction so as to provide a workable pot-life for the coating composition.

Eckberg in U.S. Pat. No. 4,262,107 discloses a silicone rubber composition with good pot-life and fast curing at elevated temperatures comprising a silanol end-stopped diorganopolysiloxane polymer, a silicone hydride cross-linker and a rhodium complex catalyst in combination with an inhibitor compound selected from low molecular weight silanol end-stopped diorganopolysiloxane, certain acetylenic compounds, olefinic carboxylic acid esters of aliphatic alcohols such as vinyl acetate, alkenyl isocyanurates and mixtures of such inhibitor compounds.

Eckberg in U.S. Pat. No. 4,347,346 discloses a solventless platinum or rhodium catalyzed addition curable polyorganosiloxane release coating composition containing a dialkylacetylenedicarboxylate inhibitor for preventing premature gelation at ambient temperatures but which still cure at elevated temperature via a hydrosilation reaction to form a coating capable of releasing materials from substrates which would normally adhere thereto.

A novel multi-component solventless silicone release system is disclosed by Grenoble and Eckberg in Ser. No. 458,421, filed Jan. 17, 1983, assigned to the same assignee as the present invention, and which is incorporated herein by reference. Therein it is disclosed that prior art two-component systems, one part of which comprises a vinyl silicone fluid, precious metal catalyst and an inhibitor, and the other part a polymethylhydrogensiloxane crosslinker, unduly limit the flexibility of the end-user to formulate solvent-free silicone release coatings which more precisely meet their performance and cost requirements. Accordingly, there is provided a multi-component system wherein the ingredients are provided the end-user in three or more separate parts to provide such flexibility. While such a multi-component system substantially eliminates the problem of premature gelation over an extended period of time, it is also desirable to further increase the useful pot-life of release coating compositions to extend the period of time during which the end-user can carry out the coating application.

Thus, there is provided by the present invention a solventless silicone release coating composition containing a two-part inhibitor which not only exhibits more effective inhibition than similar concentrations of the individual ingredients, but also improves the solubility of such inhibitor in silicone fluids. Hence the present invention provides a significant improvement over prior art release coating compositions containing a one-part inhibitor.

It is therefore a primary object of the present invention to provide a solventless composition which will render surfaces non-adherent to materials which would normally adhere thereto.

Another object of the present invention is to provide a solventless coating composition which will cure to a coating having satisfactory smear, rub-off, migration and release characteristics.

A further object of the present invention is to provide a solventless coating composition which has a satisfactory pot-life or bath-life in its catalyzed form when it is ready for use.

Still another object of the present invention is to provide a method of rendering materials nonadherent to other materials which would normally adhere thereto.

It is still a further object of the present invention to provide a release coating composition having a two-part inhibitor which effectively retards the catalyzed cross-linking reaction at temperatures below the heat cure temperature of these compositions and to provide solventless silicone compositions which are particularly well suited for paper release applications.

3

These and other objects will become apparent to those skilled in the art upon consideration of the present description, examples and claims.

SUMMARY OF THE INVENTION

The present invention provides a silicone release coating composition containing a two-part inhibitor comprised of a blend of a dialkyl carboxylic ester having carbon to carbon unsaturation and an olefinic carboxylic acid ester of an aliphatic alcohol which is effective for retarding a precious metal catalyzed addition cure hydrosilation reaction at room temperature but which does not interfere with curing at elevated temperatures. Such two-part inhibitor is especially effective for use with release coating baths containing high concentration and in the multi-component system described by Grenoble and Eckberg in Ser. No. 458,421, filed Jan. 17, 1983, and assigned to the same assignee as the present invention. The cured composition provides a silicone coating which will tenaciously adhere to a substrate, such as paper, to which it is applied, but will render such substrate substantially nonadherent to materials, such as pressure sensitive adhesives, which would normally adhere thereto.

The release coating composition containing a two-part inhibitor as provided by the present invention can be a two-component system or, more preferably, is a multi-component system of the type disclosed in Grenoble and Eckberg, Ser. No. 458,421, filed Jan. 17, 1983. Generally the release coating composition of the present invention comprises:

(a) an olefinorganopolysiloxane having structural units of the formula:

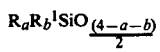  (I)

or a silanol end-stopped organopolysiloxane having the general formula:

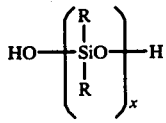  (Ia)

(b) an organohydrogenpolysiloxane having structural units of the formula:

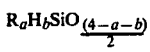  (II)

wherein R is an organic radical attached to silicon by a C—Si linkage and is selected from the group consisting of monovalent hydrocarbon radicals, halogenated monovalent hydrocarbon radicals and cyanoalkyl radicals; generally R contains from 1 to 30 carbon atoms, either in branched or linear chains, preferably from 1 to 12 carbon atoms and most preferably from 1 to 8 carbon atoms; $R^1$ is an olefinic hydrocarbon radical attached to silicon by a C—Si linkage and generally contains 1 to 20 aliphatic carbon atoms, either in branched or linear chains, and preferably 1 to 12 carbon atoms, linked by multiple bonds (e.g. vinyl, allyl, methallyl, butenyl, pentenyl, ethenyl and the like); a has a value of 0 to 3 inclusive, and preferably from about 0.5 to about 2 inclusive; b has a value from about 0.005 to about 2.0 inclusive, and the sum of a and b equals from 0.8 to 3 inclusive; and wherein the release coating composition is a fluid at room temperature having a viscosity of approximately 10 to 5000 centipoise and preferably 300 to 1000 centipoise at 25° C.;

(c) a catalytic amount of a precious metal catalyst, preferably a platinum or rhodium compound, to effect the co-reaction of (a) and (b); and (d) an amount of a blend of a dialkyl carboxylic ester having carbon to carbon unsaturation and an olefinic carboxylic acid ester of an aliphatic alcohol effective for inhibiting an addition cure hydrosilation reaction between said olefinorganopolysiloxane and said organohydrogenpolysiloxane at room temperature but is not present in an amount sufficient to prevent curing of said coating composition at elevated temperatures.

DESCRIPTION OF THE INVENTION

In accordance with the present invention there is provided a composition particularly well suited for rendering materials nonadherent to other normally adherent materials such as glue, adhesives and the like. Additionally the composition can be applied directly to a substrate without the need for a solvent, thereby avoiding the problem associated with solvent-based release compositions as described above.

The addition curable composition of the present invention can be provided as a mixture of several components wherein at least one component contains more than one ingredient as taught in the prior art. An example of such a system is described in U.S. Pat. No. 4,256,870 wherein one part includes a vinyl silicone fluid, a precious metal catalyst and an inhibitor, and a second part comprises a polymethylhydrogensiloxane cross-linker. In such a composition the inhibitor of the present invention exhibits improved solubility, and if the composition has a high platinum content further effects improved bath life. However, it is preferable that the coating composition be provided as a four part system such as that described in Ser. No. 458,421, filed Jan. 17, 1983, assigned to the same assignee as the present invention and filed concurrently herewith. Generally the disclosure of Ser. No. 458,421, filed Jan. 17, 1983, teaches that shelf-life is substantially improved for release coating compositions when the individual ingredients are stored separately, and that low temperature cure performance comparable to that of prior art high platinum content two part systems can be provided with significantly reduced catalyst concentrations as a result of more effective use of the catalyst.

The release coating composition is made up of the above-mentioned ingredients which will thermally cure on the substrate upon which it is coated and render the substrate substantially nonadherent. More particularly, the olefinorganopolysiloxanes having structural units represented by Formula I hereinabove are intended to broadly cover low viscosity fluid organopolysiloxane suitable for coating which preferably, but not necessarily, are free of silanic hydrogen and contain olefinic unsaturation by means of double or triple bonds between two adjacent aliphatic carbon atoms. Among the radicals which R represents in Formula I hereinabove are included alkyl, such as methyl, ethyl, propyl, isopropyl, butyl, octyl, dodecyl and the like; cycloalkyl, such as cyclopentyl, cyclohexyl, cycloheptyl and the like; aryl, such as phenyl, naphthyl, tolyl, xylyl, and the like; aralkyl such as phenylethyl, phenylpropyl and the like; halogenated derivatives of the aforesaid radicals including chloromethyl, trifluoromethyl, chloropropyl, chlorophenyl, dibromophenyl, tetrachlorophenyl, difluorophenyl and the like; and cyanoalkyl, such as betacyanoethyl, gamma-cyanopropyl, beta-cyanopropyl and the like. Preferably R is methyl. Furthermore, Formula I is intended to encompass those materials wherein R is a mixture of the aforesaid radicals.

Among the radicals represented by $R^1$ in Formula I are included alkenyl, such as vinyl, allyl, methallyl, butenyl, pentenyl and the like; and alkynyl, such as ethynyl, propynyl, butynyl, pentynyl and the like. Preferably $R^1$ is vinyl or allyl and most preferably $R^1$ is vinyl.

The olefinorganopolysiloxanes encompassed within the scope of Formula I are well known in the art, for example, as disclosed in U.S. Pat. No. 3,344,111 to Chalk and U.S. Pat. No. 3,436,366 to Modic, both of which are incorporated herein by reference. Similarly, their preparation and commercial availability are also well known. The olefinorganopolysiloxanes of Formula I can be characterized as copolymers of (1) siloxane units having the formula:

where R and $R^1$ are as defined above and c has a value of from 0 to 2 inclusive and the average sum of c and d is equal to from 0.8 to 3.0 inclusive, and (2) organopolysiloxane units having the structural formula:

where R is as defined above and n has a value of from 0.8 to 2.5 inclusive. Thus, where the olefinorganopolysiloxane employed herein is a copolymer of units within the scope of Formula IV and an organopolysiloxane having an average formula within the scope of Formula V, the copolymer generally contains from 0.5 to 99.5 mole percent of the units of Formula IV and from 0.5 to 99.5 mole percent of units within the scope of Formula V. The preparation of these copolymers is well known to those skilled in the art.

A major proportion of the composition is typically a vinyl chain-stopped polysiloxane having the general formula:

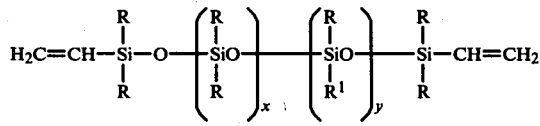

wherein R is a monovalent hydrocarbon radical free of unsaturation. Suitable radicals for R include, for example, methyl, ethyl, propyl, butyl and other similar unsaturated hydrocarbons, but ordinarily would not include phenyl groups for paper release purposes. $R^1$ is a hydrocarbon radical having alkenyl unsaturation. Typically $R^1$ represents vinyl groups but may also represent allylic or cycloalkenyl unsaturated groups; x and y are positive integers such that the vinyl chain-stopped polysiloxane has up to approximately 20% by weight of $R^1$ groups. The viscosity of such a polysiloxane ranges from approximately 50 to approximately 100,000 centipoise at 25° C. Preferably the vinyl chain-stopped polysiloxane has up to approximately 20% by weight of vinyl groups and the viscosity ranges from approximately 300 to approximately 550 centipoise at 25° C. The preferred vinyl chain-stopped polysiloxane has the general formula:

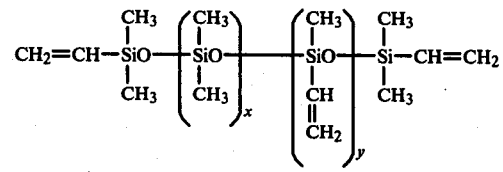

wherein x and y are as described above.

The silanol chain-stopped linear polydiorganosiloxane of Formula Ia can be used with, or in place of, the vinyl-containing copolymer of Formula I. Such silanol end-stopped polysiloxanes are prepared by equilibration of cyclic polysiloxanes in the presence of an alkali metal hydroxide catalyst. The desired viscosity is obtained by controlling the amount of water added to the reaction. These procedures are described in the literature and are well known to those skilled in the art. Furthermore, silanol chain-stopped polydimethylmethylvinylsiloxane copolymers can be envisioned which are also within the scope of the present invention.

Methylhydrogen fluid is often used by those skilled in the silicone art as a cross-linking agent for addition-cured silicone systems. Particularly useful as a cross-linking agent for the present invention is a trimethyl chain-stopped polymethylhydrogen siloxane fluid having from approximately 10% to approximately 100% SiH groups, any remaining groups being dimethylsiloxy units, and having a viscosity in the range of approximately 15 to approximately 1000 centipoise at 25° C.

The organohydrogenpolysiloxanes having structural units represented by Formula II hereinabove are intended to broadly cover fluid organopolysiloxanes which are preferably, but not necessarily, free of olefinic unsaturation, but which do contain silanic hydrogen. The organohydrogenpolysiloxanes represented by Formula II are also well known in the art, for example, as described in U.S. Pat. No. 3,344,111 and U.S. Pat. No. 3,436,366.

Among the radicals included within R of Formula II are alkyl, such as methyl, ethyl, propyl, isopropyl, butyl, octyl and the like; cycloalkyl, such as cyclopentyl, cyclohexyl, cycloheptyl and the like; aryl, such as phenyl, naphthyl, tolyl, xylyl and the like; aralkyl, such as phenylethyl, phenylpropyl and the like; halogenated derivatives of the above radicals, including chloromethyl, trifluoromethyl, chloropropyl, chlorophenyl, dibromophenyl, tetrachlorophenyl, difluorophenyl and the like; and cyanoalkyl, such as betacyanoethyl, gamma-cyanopropyl, beta-cyanopropyl and the like. Also intended to be included within the scope of Formula II are those materials where R is a mixture of the aforesaid radicals. Preferably the R group of Formula II is methyl.

Materials specifically encompassed within Formula II hereinabove include 1,3-dimethyldisiloxane and 1,1,3,3-tetramethyldisiloxane, as well as higher polymers containing up to 100,000 or more silicon atoms per molecule. Also included within the scope of Formula II are cyclic materials such as cyclic polymers of methylhydrogen siloxane having the general formula:

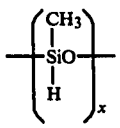

wherein x is a whole number equal to from 3 to 10 or more. Particularly included is sym-tetramethylcyclotetrasiloxane.

The organohydrogenpolysiloxanes employed in the practice of the present invention can also be characterized as copolymers containing at least one unit per molecule having the formula:

with the remaining siloxane units of the organopolysiloxane being within the scope of Formula V hereinabove, where R, c, d, and n are as defined above.

Within the scope of Formula VI are siloxane units such as hydrogen siloxane units $(HSiO)_{1.5}$, methyl hydrogen siloxane units $(HSiCH_3O)$, dimethyl hydrogen siloxane units $(H Si[CH_3]_2O)$, and dihydrogen siloxane units $(H_2SiO)$. In these copolymers, the siloxane units of Formulae V and VI are present in proportions so as to form a hydrogenpolysiloxane within the scope of Formula II hereinabove. In general such copolymers contain from 0.5 to 99.5 mole percent of siloxane units of Formula V and from 0.5 to 99.5 mole percent of siloxane units of Formula VI.

Ordinarily for release coating purposes it is preferred that the organohydrogenpolysiloxane crosslinker be essentially a trimethyl chain-stopped methylhydrogenpolysiloxane fluid having a viscosity of approximately 10 to 500 centipoise at 25° C. and a hydrogen content of from approximately 0.1 to 1.67 percent by weight.

The precious metal catalyst component utilized in compositions of the present invention includes all of the well known platinum and rhodium catalysts which are effective for catalyzing the reaction between silicon-bonded hydrogen atoms and silicon-bonded olefinic groups, and which are freely miscible in solvent-free silicone polymers. These materials especially include the platinum hydrocarbon complexes described in U.S. Pat. No. 3,159,601 and U.S. Pat. No. 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,9436 to Modic are also useful herein. All of the aforesaid U.S. patents are incorporated by reference into the present disclosure.

The curing reaction which takes place between the vinylfunctional polysiloxane and the polymethylhydrogensiloxane fluid cross-linking agent is an addition cure reaction, also known as hydrosilation. The composition of the present invention may be thermally cured by means of a platinum catalyzed cross-linking reaction between pendant vinyl groups of a dialkylvinyl chain-stopped polydialkyl-alkylvinylsiloxane copolymer and a trimethyl chain-stopped polymethylhydrogen fluid.

A particularly useful catalyst for facilitating the hydrosilation reaction is the Karstedt catalyst described in U.S. Pat. No. 3,814,730. Other platinum metal catalysts can be utilized in the practice of the present invention, however, their selection depends upon such factors as the required reaction rate, expense, useful pot-life and the temperature at which the cure reaction is to take place. Other metal catalysts useful in the present invention include those which are silicone soluble complexes of the metals rhodium, ruthenium, palladium, osmium, iridium and platinum. For coating compositions of the present invention, the amount of catalyst ranges from approximately 10 to approximately 500 ppm (as weight of metal atoms), again depending on such factors as speed of reaction and cost requirements. Preferably, the amount of catalyst is approximately 10 to 150 ppm of the precious metal.

In order to substantially eliminate the problem of premature curing or gelation it is desirable to include an inhibitor in the coating composition package. It has surprisingly been found that an inhibitor comprising a blend of a dialkyl carboxylic ester having carbon to carbon unsaturation and an olefinic carboxylic acid ester of an aliphatic alcohol is more effective as an inhibitor than similar amounts of the individual ingredients utilized alone, especially in high platinum content (i.e. low cure temperature) systems. By a high platinum content or low cure temperature system, it is meant that the catalyzed bath contains more than 50 ppm of precious metal catalyst, and typically may be more than 100 ppm of precious metal catalyst. Such two-part inhibitor is also especially useful in the multi-component packaging system of Grenoble and Eckberg Ser. No. 458,421, filed Jan. 17, 1983, as it affords the end-user with the capability of formulating release coating bath compositions suited to his specific needs. Furthermore, the inhibitor of the present invention is used more advantageously in low temperature curing release coating systems than prior art one-part inhibitors since, for example, diallylmaleate is a polar substance which is not very soluble in silicone fluids at concentrations above about 0.3 weight percent. However, in the instant invention vinyl acetate functions both as an inhibitor and as a mutual solvent for diallymaleate and silicone fluid, and accordingly, more preferred concentrations of inhibitor can be utilized which would otherwise be impractical.

Eckberg in U.S. Pat. No. 4,256,870 discloses that an amount of dialkyl carboxylic ester containing carbon to carbon unsaturation is effective to inhibit the precious metal catalyzed hydrosilation cure reaction at temperatures below the heat cure temperature of the release coating composition. Most preferably such dialkyl carboxylic ester is diallylmaleate which has the formula:

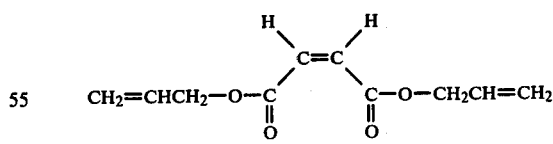

and ordinarily is utilized in a range of from approximately 0.1% to approximately 0.5% by weight. Other preferred diallylic carboxylic esters which are preferred include diallylphthalate and diallylsuccinate. Also, saturated dialkyl esters of maleic acid, such as diethyl and dimethyl maleate, and mixed esters such as butylallylmaleate or methylethylmaleate are useful as hydrosilation inhibitors for solventless release coating compositions. Other useful inhibitors can also be found in the Eckberg patent which is incorporated by reference into the instant disclosure.

The use of an olefinic carboxylic acid ester of an aliphatic alcohol is disclosed by Eckberg as an inhibitor for rhodium catalyzed silicone rubber compositions in U.S. Pat. No. 4,262,107. Therein it is taught that such compositions can be utilized at low concentrations, such as from 0.1 to 2 parts per 100 parts of the silanol base polymer, but preferably should be utilized in a concentration of 0.5 to 5 parts per 100 parts of the silanol base polymer. The preferred inhibitor compound is vinyl acetate, however, those olefinic carboxylic acid esters of an aliphatic alcohol wherein the alcohol has from 1 to 4 carbon atom and the olefinic carboxylic acid has from 2 to 10 carbon atoms are within the scope of the disclosure. This patent is also incorporated by reference into the present disclosure and is assigned to the same assignee as the present invention.

The present invention is based on the surprising discovery that a blend of a dialkyl carboxylic ester containing carbon to carbon unsaturation and an olefinic carboxylic acid ester of an aliphatic alcohol results in a blend which is a more effective inhibitor than utilizing similar amounts of the individual compounds, that is, a synergistic effect is obtained by such a blend of inhibitors.

The most preferred dialkyl carboxylic ester containing carbon to carbon unsaturation is diallylmaleate, however, any of the inhibitor compositions within the scope of U.S. Pat. No. 4,256,870 can also be utilized in the present invention. Among the preferred inhibitor compositions which also can be utilized are butylallylmaleate, diallylsuccinate, dimethylmaleate, diethylmaleate and silylmaleates such as bis-γ-propyltris (methoxy) silylmaleate which has the formula:

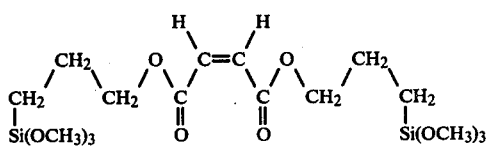

The most preferred olefinic carboxylic acid ester of an aliphatic alcohol is vinyl acetate, however, any inhibitor compound within the scope of U.S. Pat. No. 4,262,107 may also be utilized. More particularly, such compounds are those derived from an aliphatic alcohol having 1 to 4 carbon atoms and an olefinic carboxylic acid having from 2 to 10 carbon atoms.

The dialkyl carboxylic ester having carbon to carbon unsaturation, preferably diallylmaleate or butylallylmaleate, is blended with the olefinic carboxylic acid ester of an aliphatic alcohol, preferably vinyl acetate, in a ratio ranging from approximately 1:24 to 1:1, but most preferably is blended in approximately a 1:3 ratio. Accordingly, the most preferred inhibitor for the release coating composition of the present invention is a blend comprising 1 part diallylmaleate and 3 parts vinyl acetate.

It has been discovered that small amounts of such a two-part inhibitor permit exceptionally long catalyzed pot-life without sacrifice of cure performance, especially in compositions having a high platinum content. Ordinarily the effective amount of inhibitor ranges from approximately 0.05 to approximately 2% by weight, and preferably from 0.1 to 1.5% by weight. Use of the present invention results in improved pot-life yet the composition rapidly cures to a smear-free and migration-free nonadherent surface when thermally cured.

The improved inhibitor of the present invention can be provided in a conventional two package system, that is, it can be stored in one container which includes the inhibitor blend, a vinyl silicone fluid and a precious metal catalyst, while the polymethylhydrogensiloxane cross-linking agent is stored in a separate container. It is preferred, however, that a three or more component package system as disclosed in Grenoble and Eckberg, Ser. No. 458,421, filed Jan. 17, 1983, be utilized. Thus, it is preferable that each of the ingredients be stored in separate containers so that in addition to the improved pot-life provided by the inhibitor blend of the present invention, very long shelf-life is also obtained.

In addition to the foregoing ingredients, it is within the scope of the present invention that other ingredients can be included. One of the preferred additional ingredients is a vinyl-gum cure accelerator of the type disclosed by Eckberg in U.S. Pat. No. 4,340,647, which is assigned to the same assignee as the present invention and incorporated herein by reference. Therein it is disclosed that a dimethylvinyl chain-stopped polydimethylmethylvinylsiloxane polymer gum will accelerate the hydrosilation cure reaction at a realtively low temperature without sacrificing performance. Such vinyl gum may is packaged alone or preferably with the base polymer.

In order that those skilled in the art might be better able to practice the present invention, the following examples are given by way of illustration and not by way of limitation.

DESCRIPTION OF THE PREFERRED EMBODIMENTS

EXAMPLES 1 TO 14

In the following examples, release coating compositions were prepared from the following ingredients:

(A) a mixture consisting of 100 parts of a linear dimethylvinyl chain-stopped polydimethylsiloxane fluid having a viscosity of 120 cps at 25° C. and 5 parts of a dimethylvinyl chain-stopped linear polydimethylmethylvinylsiloxane copolymer gum having a molecular weight of approximately 300,000 and containing 0.2 mole percent methylvinyl siloxane units, such mixture having a viscosity of approximately 400 cps at 25° C.;

(B) a solution of a platinum catalyst in a dimethylvinyl end-stopped polydimethylsiloxane fluid having a viscosity of 300 cps at 25° C., there being sufficient catalyst present to afford 1800 ppm platinum (as metal) in the solution;

(C) a trimethylsiloxy chain-stopped linear polymethylhydrogensiloxane fluid having a viscosity of approximately 20 to 40 cps at 25° C. as a cross-linking agent; and (D) a blend of 3 parts vinyl acetate to 1 part of diallylmaleate.

Initial experiements were performed by preparing release coating composition baths as described in Table I.

TABLE I

| Bath | Example 1 | Example 2 | Example 3 | Example 4 |
|---|---|---|---|---|
| Ingredient A | 150.0 g | 150.0 g | 150.0 g | 150.0 g |
| Ingredient B | 2.1 | 4.17 | 8.33 | 12.51 |
| Ingredient C | 6.0 | 6.0 | 6.0 | 6.0 |
| Ingredient D | 0.3 | 0.6 | 1.2 | 1.8 |
| ppm Pt | 24.0 | 47.0 | 91.0 | 134.0 |
| Total Inhibitor, % | 0.2 | 0.39 | 0.75 | 1.10 |
| ViOAc, % | 0.15 | 0.29 | 0.56 | 0.82 |

TABLE I-continued

| Bath | Example 1 | Example 2 | Example 3 | Example 4 |
|---|---|---|---|---|
| DAM, % | 0.05 | 0.10 | 0.19 | 0.28 |

The viscosities of the four release coating baths were monitored as a function of time under still conditions at 25° C. over a seven hour period. The results set forth in Table II illustrate that the two-part inhibitor of the present invention provides a release coating bath having a satisfactory pot-life. Note that for purposes of these experiments, the cross-linking agent was added at time zero.

TABLE II

| Bath | Example 1 | Example 2 | Example 3 | Example 4 |
|---|---|---|---|---|
| Initial | 500 cps | 495 cps | 465 cps | 460 cps |
| 2 hours | 525 | 525 | 490 | 480 |
| 4 hours | 530 | 525 | 505 | 480 |
| 7 hours | 540 | 550 | 525 | 495 |

Thus it can be seen that varying amounts of the diallylmaleate/vinyl acetate inhibitor gave satisfactory pot-life while effectively controlling the percentage viscosity increase of the catalyzed baths regardless of the absolute level of catalyst.

EXAMPLES 5 AND 6

In the following examples two baths were prepared identically to that of Example 1 with the exception that each contained only one of the inhibitors of the blend utilized in Example 1. The composition of these release coating baths is shown in Table III.

TABLE III

| Bath | Example 5 | Example 6 |
|---|---|---|
| Ingredient A | 150.0 g | 150.0 g |
| Ingredient B | 2.1 | 2.1 |
| Ingredient C | 6.0 | 6.0 |
| ViOAc | 0.23 (0.15%) | Not present |
| DAM | Not present | 0.08 (0.05%) |
| ppm Pt | 24 | 24 |

The viscosities of the two release coating baths were again monitored as a function of time under still conditions at 25° C. over a seven hour period. The results are set forth in Table IV.

TABLE IV

| Bath | Example 5 | Example 6 |
|---|---|---|
| Initial | 360 cps | 365 cps |
| 2 hours | 500 | 525 |
| 4 hours | 670 | 750 |
| 7 hours | 1025 | 4000 |

Although the viscosity of each bath doubled in approximately four hours, the results are unremarkable in the sense that the total inhibitor concentration in the bath of Example 1 exceeds the total inhibitor load in the bath of either Example 5 or Example 6.

EXAMPLES 7 TO 9

Experiments were then run to determine the effectiveness of the individual inhibitors at levels comparable to the level of two-part inhibitor utilized in Example 1. The composition of these release coating baths is shown in Table V.

TABLE V

| Bath | Example 7 | Example 8 |
|---|---|---|
| Ingredient A | 150.0 g | 150.0 g |
| Ingredient B | 2.1 | 2.1 |
| Ingredient C | 6.0 | 6.0 |
| ViOAc | 0.31 (0.2%) | Not present |
| DAM | Not present | 0.31 (0.2%) |
| ppm Pt | 24.0 | 24.0 |

The viscosities of the release coating baths were once again monitored as a function of time under still conditions at 25° C. over a seven hour period. The results are illustrated in Table VI.

TABLE VI

| Bath | Example 7 | Example 8 |
|---|---|---|
| Initial | 335 cps | 355 cps |
| 2 hours | 480 | 370 |
| 4 hours | 620 | 375 |
| 7 hours | 900 | 380 |

These results show that the combined diallylmaleate/vinyl acetate inhibitor significantly improves upon the inhibitory effect of vinyl acetate alone. While the bath composition of Example 8 has a satisfactory bath life, it is not useful for a low temperature cure applications, such as those of the bath in Example 4. Moreover, even in those compositions which require high temperature curing, the inhibitor blend of the present invention exhibits improved solubility thus enabling more preferred concentrations of inhibitor to be utilized. Next, a release coating bath having a high platinum content, that is, comparable to that of Example 4, was prepared to determine the effectiveness of diallylmaleate in such a bath. The composition of this bath is set forth in Table VII.

TABLE VII

| Bath | Example 9 |
|---|---|
| Ingredient A | 150.0 g |
| Ingredient B | 12.5 |
| Ingredient C | 6.0 |
| DAM | 0.49 (0.3%) |
| ppm Pt | 134 |

The viscosity of the bath was monitored as a function of time under still conditions at 25° C. over a seven hour period, the results being shown in Table VIII.

TABLE VIII

| Bath | Example 9 |
|---|---|
| Initial | 350 cps |
| 2 hours | 590 |
| 4 hours | 1200 |
| 7 hours | GEL |

Thus it can be seen that diallylmaleate alone is not effective for use in high platinum content release coating composition baths, whereas a bath which instead utilizes the two part inhibitor of the present invention provides a useful pot-life of 7 hours or more.

While the examples and claims cited in U.S. Pat. No. 4,256,870 include references to silicone compositions in which diallymaleate alone inhibits premature curing in the presence of high levels of platinum, it should be understood that the catalyst specified therein is the Lameroux catalyst of U.S. Pat. No. 3,220,972. The Lameroux catalyst has been found to be ineffective for promoting commercially useful cure rates at temperatures below 250° F., even at platinum concentrations as high as 200 ppm. For example, U.S. Pat. No. 4,256,870 discloses that a composition which includes 200 ppm Lameroux catalyst and 0.5% diallylmaleate requires 40 seconds to cure at 250° F. Use of the Karstedt or Askby type catalysts, on the other hand, permits curing in less than 30 seconds at temperatures as low as 200° F. and in the presence of 100 to 200 ppm platinum catalyst. High concentrations (>3000 ppm) of diallylmaleate by itself is incompatible with high concentrations of Karstedt or Ashby platinum catalyst (i.e. >100 ppm Pt), and causes rapid precipitation of insoluble platinum residues. Thus, further research has shown that diallymaleate alone is not suitable as an inhibitor for high platinum content compositions nor for the multi-component system described by Grenoble and Eckberg in, Ser. No. 458,421, filed Jan. 17, 1983.

I claim:
1. A composition comprising:
   (a) an olefinorganopolysiloxane or silanol end-stopped diorganopolysiloxane polymer,
   (b) an organohydrogenpolysiloxane cross-linking agent,
   (c) at least 50 ppm of a precious metal or precious metal containing catalyst, and
   (d) an effective amount of an inhibitor comprising a blend of a dialkyl carboxylic ester having carbon to carbon unsaturation and an olefinic carboxylic acid ester of an aliphatic alcohol.
2. The composition of claim 1 wherein the olefinorganopolysiloxane has structural units of the formula:

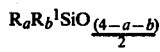

and the organohydrogenpolysiloxane has structural units of the formula:

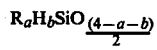

wherein R is an organic radical selected from the group consisting of monovalent hydrocarbon radicals, halogenated monovalent hydrocarbon radicals, cyanoalkyl radicals and mixtures thereof and which has from 1 to 30 carbon atoms; $R^1$ is an olefinic hydrocarbon radical having from 1 to 20 carbon atoms; a has a value ranging from 0 to 3 inclusive, b has a value ranging from about 0.005 to about 2.0 inclusive, and the sum of a and b equals 0.8 to 3 inclusive; and wherein the coating composition is a fluid at 25° C. having a viscosity ranging from approximately 10 centipoise to 5000 centipoise.
3. The composition of claim 2 where R is methyl.
4. The composition of claim 2 where $R^1$ is vinyl or allyl.
5. The composition of claim 1 wherein the olefinorganopolysiloxane is a dimethylvinyl chain-stopped dimethylmethyl vinylpolysiloxane copolymer fluid having a viscosity of approximately 100 to 1000 centipoise at 25° C. and a vinyl content of up to 2.5 weight percent.
6. The composition of claim 1 wherein the organohydrogenpolysiloxane is a trimethyl chain-stopped methylhydrogenpolysiloxane fluid having a viscosity of approximately 10 to 500 centipoise at 25° C. and a hydrogen content of approximately 0.1 to 1.67 percent by weight.
7. The composition of claim 1 wherein the precious metal catalyst is selected from the group consisting of platinum metal, rhodium metal, complexes of platinum metal and complexes of rhodium metal.
8. The composition of claim 7 wherein the precious metal catalyst is present in an amount sufficient to provide approximately 50 to 500 parts of catalyst as platinum or rhodium metal per million parts of olefinorganopolysiloxane.
9. The composition of claim 1 wherein the dialkyl carboxylic ester is selected from the group consisting of diallylmaleate, butylallylmaleate, diallylsuccinate and dialkyl esters of maleic acid selected from the group consisting of dimethylmaleate, diethylmaleate and silylmaleate.
10. The composition of claim 1 wherein the dialkyl carboxylic ester is diallylmaleate.
11. The composition of claim 1 wherein the olefinic carboxylic acid ester of an aliphatic alcohol is formed from an alcohol having from 1 to 4 carbon atoms and an olefinic carboxylic acid having from 2 to 10 carbon atoms.
12. The composition of claim 1 wherein the olefinic carboxylic acid ester of an aliphatic alcohol is vinyl acetate.
13. The composition of claim 1 wherein the dialkyl carboxylic ester is blended with an olefinic carboxylic acid ester of an aliphatic alcohol in a ratio of from approximately 1:24 to approximately 1:1.
14. The composition of claim 1 wherein the dialkyl carboxylic ester is blended with an olefinic carboxylic acid ester of an aliphatic alcohol in a ratio of approximately 1 to 3.
15. The composition of claim 1 wherein diallylmaleate is blended with vinyl acetate in a ratio of approximately 1 to 3.
16. The composition of claim 1 wherein the inhibitor is present in an amount ranging from approximately 0.05 to 2 percent by weight.
17. The composition of claim 1 wherein the inhibitor is present in an amount ranging from approximately 0.1 to 1.5 percent by weight.
18. The composition of claim 1 further comprising a substrate upon which the composition has been coated and thermally cured.
19. The composition of claim 18 wherein the substrate is paper.
20. A composition comprising:
   (a) a dimethylvinyl chain-stopped dimethylmethylvinylpolysiloxane copolymer fluid having a viscosity of approximately 100 to 1000 centipoise at 25° C. and a vinyl content of approximately 0.1 to 2.5 weight percent;
   (b) a trimethyl chain-stopped methylhydrogenpolysiloxane fluid having a viscosity of approximately 10 to 500 centipoise at 25° C. and a hydrogen content of approximately 0.1 to 1.67 percent by weight;
   (c) 50 to 500 parts of a precious metal catalyst as precious metal selected from the group consisting of platinum metal, rhodium metal, complexes of platinum metal and complexes of rhodium metal; and
   (d) 0.05 to 2 percent by weight of an inhibitor comprising a blend of diallylmaleate and vinyl acetate in a ratio of approximately 1 to 3.
21. A process for rendering surfaces nonadherent to materials which would normally adhere thereto, comprising the steps of:

A. providing a silicone release coating composition by combining:
(a) an olefinorganopolysiloxane or silanol end-stopped diorganopolysiloxane polymer,
(b) an organohydrogenpolysiloxane cross-linking agent,
(c) at least 50 ppm of a precious metal or precious metal containing catalyst for effecting the co-reaction of (a) and (b), and
(d) an effective amount of an inhibitor comprising a blend of a dialkyl carboxylic ester having carbon to carbon unsaturation and an olefinic carboxylic acid ester of an aliphatic alcohol;
B. applying said silicone release coating on a suitable substrate, and
C. curing said silicone release coating with an amount of heat effective for overcoming the cure retarding ability of said inhibitor.

22. The process of claim 21 wherein the olefinorganopolysiloxane has structural units of the formula:

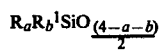

and the organohydrogenpolysiloxane has structural units of the formula:

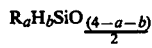

wherein R is an organic radical selected from the group consisting of monovalent hydrocarbon radicals, halogenated monovalent hydrocarbon radicals, cyanoalkyl radicals and mixtures thereof and which has from 1 to 30 carbon atoms; $R^1$ is an olefinic hydrocarbon radical having from 1 to 20 carbon atoms; a has a value ranging from 0 to 3 inclusive, b has a value ranging from about 0.005 to about 2.0 inclusive, and the sum of a and b equals 0.8 to 3 inclusive; and wherein the coating composition is a fluid at 25° C. having a viscosity ranging from approximately 10 centipoise to 5000 centipoise.

23. The process of claim 22 where $R^1$ is methyl.

24. The process of claim 22 where $R^1$ is vinyl or allyl.

25. The process of claim 21 wherein the olefinorganopolysiloxane is a dimethylvinyl chain-stopped dimethylmethylvinylpolysiloxane copolymer fluid having a viscosity of approximately 100 to 1000 centipoise at 25° C. and a vinyl content of approximately 0.1 to 2.5 weight.

26. The process of claim 21 wherein the organohydrogenpolysiloxane is a trimethyl chain-stopped methylhydrogenpolysiloxane fluid having a viscosity of approximately 10 to 500 centipoise at 25° C. and a hydrogen content of approximately 0.1 to 1.67 percent by weight.

27. The process of claim 21 wherein the precious metal catalyst is selected from the group consisting of platinum metal, rhodium metal, complexes of platinum metal and complexes of rhodium metal.

28. The process of claim 27 wherein the precious metal catalyst is present in an amount sufficient to provide approximately 50 to 500 parts of catalyst as platinum or rhodium metal per million parts of olefinorganopolysiloxane.

29. The process of claim 21 wherein the dialkyl carboxylic ester is selected from the group consisting of diallylmaleate, butylallylmaleate, diallylsuccinate, and dialkylester of maleic acid selected from the group consisting of dimethylmaleate, diethylmaleate, and silylmaleate.

30. The process of claim 21 wherein the dialkyl carboxylic ester is diallylmaleate.

31. The process of claim 21 wherein the olefinic carboxylic acid ester of an aliphatic alcohol is formed from an alcohol having from 1 to 4 carbon atoms and an olefinic carboxylic acid having from 2 to 10 carbon atoms.

32. The process of claim 21 wherein the olefinic carboxylic acid ester of an aliphatic alcohol is vinyl acetate.

33. The process of claim 21 wherein the dialkyl carboxylic ester is blended with an olefinic carboxylic acid ester of an aliphatic alcohol in a ration of from approximately 1:24 to 1:1.

34. The process of claim 21 wherein the dialkyl carboxylic ester is blended with an olefinic carboxylic acid ester of an aliphatic alcohol in a ratio of approximately 1 to 3.

35. The process of claim 21 wherein diallylmaleate is blended with vinyl acetate in a ratio of approximately 1 to 3.

36. The process of claim 21 wherein the inhibitor is present in an amount ranging from approximately 0.05 to 2 percent by weight.

37. The process of claim 21 wherein the inhibitor is present in an amount ranging from approximately 0.1 to 1.5 percent by weight.

38. The process of claim 21 wherein the substrate is paper.

39. A process for rendering surfaces nonadherent to materials which would normally adhere thereto, comprising the steps of:
A. providing a silicone release coating composition by combining:
(a) a dimethylvinyl chain-stopped dimethylmethylvinylpolysiloxane copolymer fluid having a viscosity of approximately 100 to 1000 centipoise at 25° C. and a vinyl content of approximately 0.1 to 2.5 percent by weight;
(b) a trimethyl chain-stopped methylhydrogenpolysiloxane fluid having a viscosity of approximately 10 to 500 centipoise at 25° C. and a hydrogen content of approximately 0.1 to 1.67 percent by weight;
(c) 50 to 500 parts of a precious metal catalyst as precious metal selected from the group consisting of platinum metal, rhodium metal, complexes of platinum metal and complexes of rhodium metal;
(d) 0.05 to 2 percent by weight of an inhibitor comprising a blend of diallylmaleate and vinyl acetate in a ratio of approximately 1 to 3;
B. applying said silicone release coating composition on a suitable substrate; and
C. curing said silicone release coating with an amount of heat effective for overcoming the cure retarding ability of said inhibitor.

40. A method for providing a coating bath comprising mixing:
(a) an olefinorganopolysiloxane or silanol endstopped diorganopolysiloxane polymer,
(b) an organohydrogenpolysiloxane cross-linking agent,
(c) at least 50 ppm of a precious metal or precious metal containing catalyst, and (d) an effective amount of inhibitor comprising a blend of a dialkyl carboxylic ester having carbon to carbon unsaturation and an olefinic carboxylic acid ester of an aliphatic alcohol.

41. The method of claim 40 wherein the precious metal catalyst is selected from the group consisting of platinum metal, rhodium metal, complexes of platinum metal and complexes of rhodium metal.

42. The method of claim 41 wherein the precious metal catalyst is present in an amount sufficient to provide 50 to 500 ppm of catalyst as platinum or rhodium metal per million parts of olefinorganopolysiloxane.

* * * * *